Sept. 27, 1932.  K. M. BAERULFSEN  1,880,167
FOLDING BABY CARRIAGE
Filed Feb. 25, 1931   2 Sheets-Sheet 1

K. M. Baerulfsen
INVENTOR

By Marks & Clerk
ATTYS.

Sept. 27, 1932.　　　K. M. BAERULFSEN　　　1,880,167
FOLDING BABY CARRIAGE
Filed Feb. 25, 1931　　2 Sheets-Sheet 2
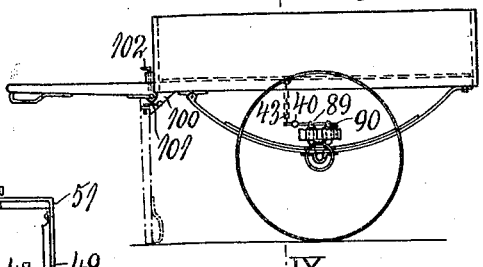
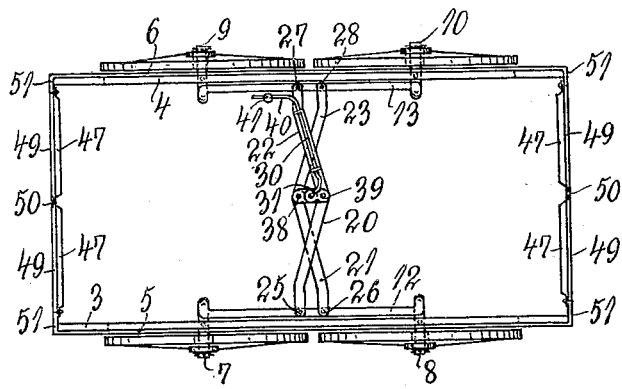
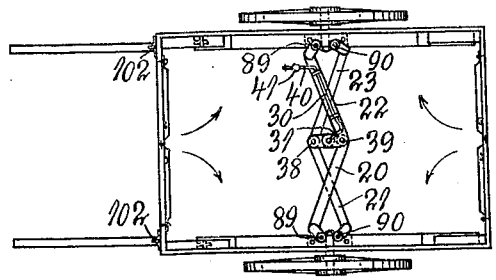
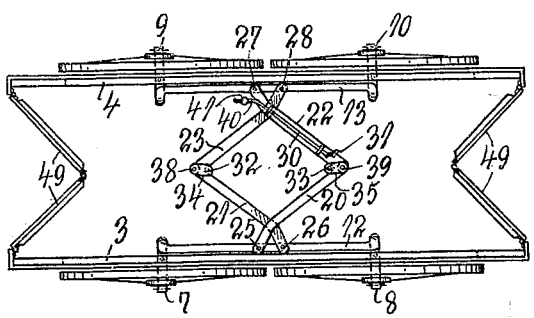
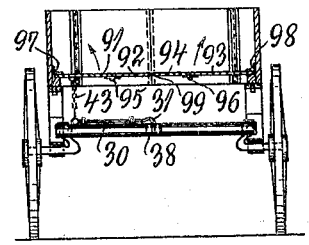
K. M. Baerulfsen, INVENTOR
By Marks & Clerk, Attys.

Patented Sept. 27, 1932

1,880,167

UNITED STATES PATENT OFFICE

KARL MAGNUS BÆRULFSEN, OF OSLO, NORWAY

FOLDING BABY CARRIAGE

Application filed February 25, 1931, Serial No. 518,211, and in Norway March 14, 1930.

My invention relates to two—and four-wheeled vehicles of the kind which are adapted to be folded up or collapsed in a transverse direction, and in which the wheel axles are interconnected by aid of a link system. The object of my invention is to provide vehicles of this kind, which are easily foldable and at the same time of a strong and simple construction. Other objects of my invention will be explained with reference to the accompanying drawings, in which:

Fig. 4 is a plan view of the same, but with the carriage bottom removed.

Fig. 5 is a corresponding plan view, with the parts partly folded together.

Fig. 7 is a side view of a pushcart arranged in accordance with my invention.

Fig. 8 is a plan view of the same, with the bottom removed and

Fig. 9 is a cross sectional view on line IX—IX, Fig. 7.

Figure 1:
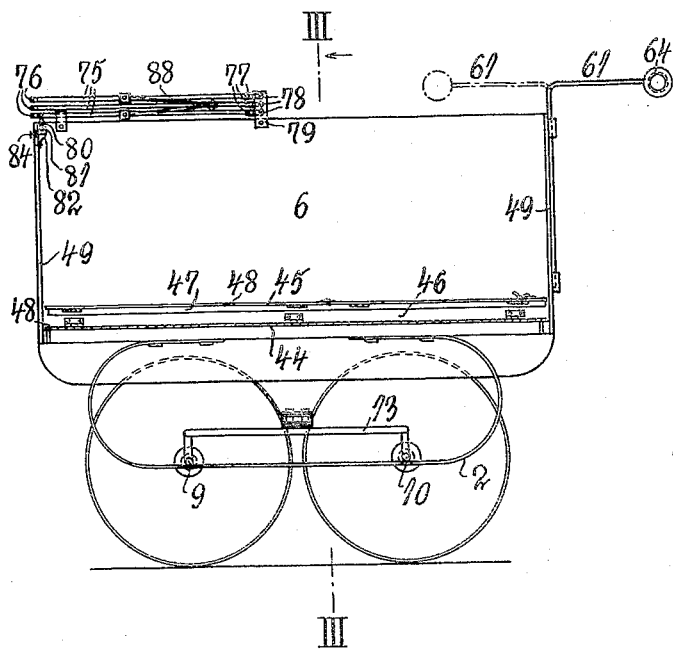
Fig. 1 is a vertical sectional view of a folding baby carriage, arranged according to my invention, on line I—I, Fig. 2.
Figure 3:
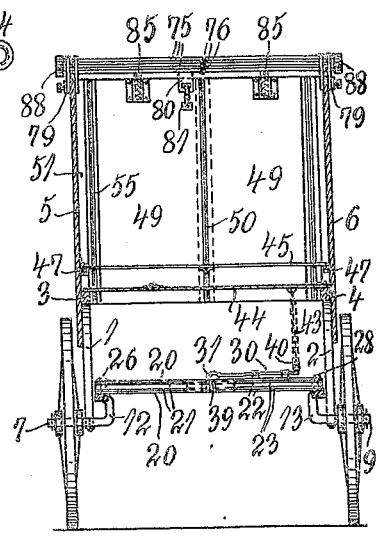
Fig. 3 is a transverse vertical section on line III—III, Fig. 1.
Figure 2:
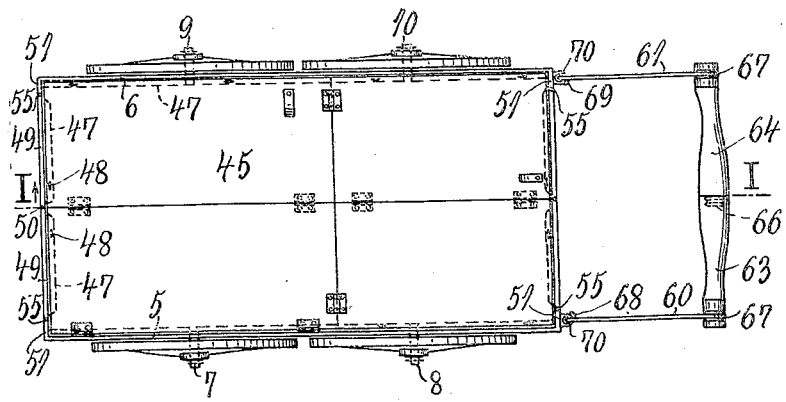
Fig. 2 is a corresponding plan view.

Referring now to Figs. 1 to 6, the carriage wheel axles are fastened to spring bails 1, 2, the upper parts of which are fastened to bars 3 and 4 respectively, fastened to the inside of the side walls 5, 6 of the carriage frame. The axles 7, 8 and 9, 10 respectively, of the wheels on the same side of the carriage are made in one piece, forming upturned horizontal bails 12 and 13, on which bails is journalled a transverse link system. This link system comprises crosslaid double links or arms 20, 21, 22, 23, whose ends are journalled on vertical bolts 25, 26 and 27, 28 on bails 12 and 13, respectively, in such manner that they interconnect the two axle bails. As will be seen from Fig. 3, each of the four links 20, 21, 22, 23 consists of two parallel parts spaced above each other, and these four double links are crosslaid in such manner that two of the said links (20 and 22) with their spaced parts grip about the corresponding parts of the two other double links (21 and 23), the free ends of the double links 21 and 23 being interconnected by a hinge link 38, and the ends of the two other double links 20 and 22 being interconnected by a hinge link 39. This arrangement of spaced parts of the double links 20 and 22, gripping about and guiding the double links 21 and 23, respectively, is an important feature of the construction, ensuring the sure guidance and rigidity of the link system. If desired, the spaced parts of the double links 20 and 22, which encase the links 21 and 23, may be given a T-shaped cross section or other strong section, in order to ensure a still greater rigidity of the link system.

On the top of the link 22 is journalled a horizontal rod 30, ending at one end in a hook 31 which in one position of the rod engages holes 32, 33 in overlapping tongues 34, 35 of the hinge links 38, 39, thereby locking these together.

Figure 6:
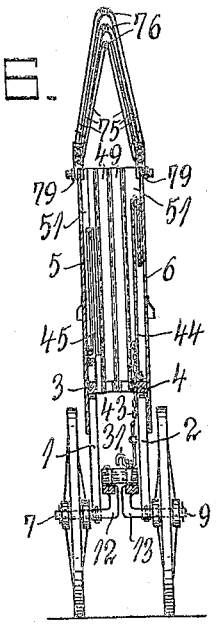
Fig. 6 is a cross sectional view of the carriage in folded position.

The other end of the rod 30 forms an angular arm 40, provided with a weight 41, having for purpose to turn automatically the rod 30 so as to make the hook 31 engage and lock together the tongues 34, 35, when the carriage is in its fully expanded position ready for use. The free end 40 is connected to the carriage bottom 44 by a chain 43 or the like in such manner that, when this bottom 44 is collapsed as shown in Fig. 6, it exerts a pull in the chain 43, thereby turning the rod 30 and disengaging the hook 31 from the tongues 34 and 35, in order that the link system may be free to be folded together, whereas when this system is again expanded on the carriage being brought into position for use, the weight 41 on the arm 40 will automatically swing the hook 31 into engagement with the link system, so as to lock it in its expanded position.

Besides the bottom 44, the carriage may also have an upper bottom 45, the space between the two bottoms being used for storing clothes or the like.

The bottoms are made of several plates interconnected by hinges, and are connected to the side walls 5, 6 of the carriage. They are supported by laths 47, fastened to the inside of the walls. These laths may be provided with lugs 48, fitting into holes in the bottom plates in order to reinforce the carriage still further. The end walls 49 of the carriage are made in two parts, interconnected by hinges 50 and at the corners hinged to lugs 51 on the side walls 5, 6, in order to make room for the bottoms in collapsed position.

At the end corners of the carriage are journalled rods 60, 61, turnable about a vertical axis and carrying the handle parts 63, 64, which may be interconnected by aid of a screw part 66, adapted to be screwed into a socket in the other part of the handle. These handle parts are journalled on lugs 67, attached to the ends of the rods 60, 61.

For the purpose of keeping these arms in position, they are provided with lugs 68, 69, engaging the journals 70. When the interconnection between the handle parts 63, 64 is severed, the arms 60, 61 may be swung back as indicated in broken lines in Fig. 1, and the handle parts may again be interconnected in this position and may then serve to prevent the child from coming out of the carriage, to suspend playthings in, or the like. The carriage is provided with a hood or top, having two-part ribs 75, hinged at 76, so as to fold together, when the carirage is folded or collapsed (Fig. 6).

The free ends of the ribs are turnably mounted in sleeves 77, having horizontal pivots 78 journalled in mountings 79, which are attachably fastened to the edge of the side walls of the carriage. The lowermost rib is in its front end provided with a depending lug 80, having a boring, with which engages a tooth 81 on a spring 82, fastened to the inner side of the front wall. This spring may be disengaged by pressing a button 84, protruding through a boring in the front wall and fastened to the spring 82 in such manner that the pressure on the spring releases the tooth 81 from the lug 80 of the rib, whereupon this rib, is lifted by a spring actuated lug 85 mounted on the inside of the front wall, thereby bending all of the ribs about their hinges. When pressure is exerted against the side walls of the carriage for the purpose of folding it up, the ribs will automatically be bent further about their top hinges (Fig. 6). The ribs are locked in position for use in the usual manner by aid of a hinged arm 88, having its ends fastened to the lowermost and topmost ribs respectively.

When folded, this baby carriage will occupy only a small space, and it may easily be carried by a single person, side handles (not shown) being preferably provided for this purpose.

It is also easily handled for folding up, the parts automatically opening up and folding by pressure against the side walls after the bottoms having been folded up.

In the application of my invention on a pushcart as illustrated in Figs. 7 to 9, the link system is applied direct to the wheel axles, these being provided with upturned arms 88, 90, to which the ends of the link system are connected. The wheel axles are fastened to usual carriage springs, carrying the cart body. The bottom of the cart is made up of four boards 91, 92, 93 and 94, interconnected by hinges 95 and 96 (Fig. 9), and the outer boards 91 and 93 are connected to the sides of the cart by hinges 97, 98.

In the middle of the bottom is provided an opening 99 for inserting a hand, when the cart is to be collapsed. The hinges are arranged on the under side of the bottom, so as to be out of the way for the goods to be transported.

The end walls of the cart body are made in two hinged parts as described in the foregoing for the baby carriage.

The drag arms of the cart may be arranged with hinges, so as to enable their being swung down in the position indicated in broken lines in Fig. 7 in order to support the cart. In this position the arms abut against abutments 100, provided with hooks 101, locking them in this position. These arms are locked in their normal, upturned position by aid of spring detents 102.

Claims.

1. In vehicles of the kind adapted to be folded up in a transverse direction, and in which a link system forms the foldable interconnection between the opposite wheel axles, a link system comprising two pairs of crosslaid links turning about spaced pivots on members fastened between the wheel axles on opposite sides of the carriage and, linked together at the ends, said links being arranged as double links, each link being composed of two spaced link parts and arranged in such manner that in the links crossing each other the link parts of one link embrace and guide the link parts of the other link.

2. In vehicles of the kind adapted to be folded up in a transverse direction, and in which a link system forms the foldable interconnection between the opposite wheel axles, a link system comprising two pairs of crosslaid links, linked together at the ends, said links being arranged as double links, each link being composed of two spaced link parts and arranged in such manner that in the links crossing each other the link parts of one link embrace and guide the link parts of the other link, one of said links carrying a rod provided with a hook, held in locking engagement with the link system when the vehicle is in position for use, but automatically released when the bottom of the vehicle is folded up.

3. In vehicles of the kind adapted to be folded up in a transverse direction, and in which a link system forms the foldable interconnection between the opposite wheel axles, a link system comprising two pairs of cross-laid links, linked together at the ends, said links being arranged as double links, each link being composed of two spaced link parts and arranged in such manner that in the links crossing each other the link parts of one link embrace and guide the link parts of the other link, the inner part of the wheel axles on opposite sides of the vehicle being bent upwards and interconnected by members serving as holders for the spaced pivots of the said link system.

In testimony whereof I have signed my name unto this specification.

KARL MAGNUS BÆRULFSEN.